(12) United States Patent
Boyle et al.

(10) Patent No.: US 6,586,707 B2
(45) Date of Patent: Jul. 1, 2003

(54) CONTROL OF LASER MACHINING

(75) Inventors: Adrian Boyle, Monasterevin (IE); Kali Dunne, Boyle (IE); Maria Farsari, Dublin (IE)

(73) Assignee: Xsil Technology Limited, Dublin (IE)

( * ) Notice: Subject to any disclaimer, the term of this patent is extended or adjusted under 35 U.S.C. 154(b) by 41 days.

(21) Appl. No.: 09/984,086

(22) Filed: Oct. 26, 2001

(65) Prior Publication Data

US 2002/0088780 A1 Jul. 11, 2002

(30) Foreign Application Priority Data

Oct. 26, 2000 (IE) ................................................. 000865
Dec. 15, 2000 (IE) ................................................. 001015
Dec. 15, 2000 (IE) ................................................. 001022

(51) Int. Cl.$^7$ .............................................. B23K 26/38
(52) U.S. Cl. ................................ 219/121.69; 219/121.8
(58) Field of Search ....................... 219/121.67, 121.68, 219/121.69, 121.72, 121.8, 121.83, 121.84

(56) References Cited

U.S. PATENT DOCUMENTS

| | | | |
|---|---|---|---|
| 4,224,101 A | 9/1980 | Tijburg et al. | 156/643 |
| 5,214,261 A | 5/1993 | Zappella | 219/121 |
| 5,916,460 A | 6/1999 | Imoto | 219/121 |
| 6,057,525 A * | 5/2000 | Chang et al. | |
| 6,423,928 B1 * | 7/2002 | Piwczyk | |

FOREIGN PATENT DOCUMENTS

EP          0202630 A2          11/1986

* cited by examiner

Primary Examiner—Samuel M. Heinrich
(74) Attorney, Agent, or Firm—Timothy J. Keefer; Wildman, Harrold, Allen & Dixon

(57) ABSTRACT

A UV laser beam is used to machine semiconductor. The beams intensity ($I_B$) is chosen so that it lies in a range of such values for which there is an increasing (preferably linear) material removal rate for increasing $I_B$ An elongate formation such as a trough or a slot is machined in n scans laterally offset (O_centre), for each value of z-integer in the z direction.

29 Claims, 17 Drawing Sheets

A five step machining strategy requiring a total of 28 laser scans.

Three step machining strategy for a similar volume as figure 6 requiring a total of 11 laser scans

CONTROL OF LASER MACHINING

FIELD OF THE INVENTION

The invention relates to the control of laser machining, particularly of semiconductor material such as silicon wafers, Gallium Arsenide, Silicon Germanium, Indium Phosphide and others.

PRIOR ART DISCUSSION

Machining a semiconductor wafer is conventionally achieved by dicing the wafer with a saw. For example, EP0202630 describes the use of a dicing saw for machining streets in silicon wafers. Mechanical machining has disadvantages such as low yield, chipping and cracks. Thin wafers cannot be machined and specialised applications such as machining curved structures, internal through holes, etc., are not possible.

It is also known to use laser beams for machining semiconductor substrates. U.S. Pat. No. 5,214,261 describes a method where deep ultraviolet excimer laser beams are used to dice a semiconductor substrate. Excimer lasers, however, do not cut with sufficient speed for many applications.

Other lasers such as Nd:YAG (1064 nm) and $CO_2$ laser have also been used in semiconductor substrate micromachining. These lasers generate debris and large heat affected zones. U.S. Pat. No. 4,224,101 describes the use of a Nd:YAG laser to form grooves in a semiconductor. This step is followed by a cleave and break step along the grooves. A further step requiring chemical etching was used to remove the debris and hot particles that land on the wafer and fuse to the surface during machining.

These lasers do not appear to have been applied successfully to precision applications. The reason for this is that the quality of the edge formed is not acceptable. Also, heat is generated at the cut front, this may result in damage to the electrical function for which the component was manufactured. Heating of the substrate material induces thermal stress in the wafer which can cause microcracks, having a deleterious effect on lifetime and function.

U.S. Pat. No. 5,916,460 describes the use of a defocused beam and a high-pressure flow of assist gas to suppress the generation of microcracks. A defocused beam incident on the surface of the wafer generates a crack, which propagates along the dicing direction. Controlling such a process is difficult.

This invention is therefore directed towards providing for improved machining of semiconductor material. The improvements specifically, are that the process throughput and quality are sufficient to allow low cost manufacturing of components as well as enabling the manufacture of precision micro-machined structures such as micro-fluidic devices.

SUMMARY OF THE INVENTION

According to the invention, there is provided method of machining a semiconductor material using a laser beam in which a formation is machined in the material to a width S using a laser beam of intensity $I_B$, and in which the beam is controlled to machine the material with a kerf K, characterised in that, the beam is controlled to scan n times, n being $n \geqq 1$ and, where $n>1$, each subsequent scan is laterally offset and parallel to a preceding scan, and n is $\geqq S/K$.

In one embodiment, the value for $I_B$ is chosen to lie in a range of values of $I_B$ for which material removal rate increases with increasing $I_B$ In a further embodiment, $I_B$ is in a range for which material removal rate increases at a rate of at least 30% with increasing intensity.

In one embodiment, the lateral offset between scans is in the range from one micron to the kerf K.

In a further embodiment, the lateral offset between scans is selected by varying the lateral offset in steps from one micron to the kerf until the net machining speed is optimised.

In one embodiment, machining is achieved by repeating scans with $n \geqq 1$ in each of a number of steps (z) so that material is removed in a sequence of steps from the surface downwards.

In one embodiment, the beam dimensions at focus are controlled so that the beam intensity, $I_B$, results in minimisation of the total number of scans required to define the required formation.

In one embodiment, the laser beam is pulsed, and the pulse repetition frequency and scan speed are chosen to provide a pulse overlap in the range of 30% to 98%.

In another embodiment, the laser beam is pulsed, and the pulse overlap is selected in the region of 30% to 85% to control and refine the texture and roughness of the walls of a machined channel or the walls and bottom of a machined trough and to clean residual debris.

In one embodiment, the channel width (S) is chosen so that the net machining speed is fastest when compared to the machining speed for larger or smaller channel widths as machined under optimal values for the number of parallel laser lines for that particular channel width.

In one embodiment, the laser beam wavelength is in the range of 350 nm to 550 nm, the repetition frequency is greater than 5 kHz, and the average laser beam power is greater than 3 W.

In another embodiment, the laser beam wavelength is in the range of 250 to 300 nm, the repetition frequency is greater than 1 kHz, and the average power output is greater than 1 W.

In one embodiment, scan velocity, laser power, and pulse overlap are chosen to control depth of material removal in any one scan.

In another embodiment the method comprises the further step of, after machining, performing a final laser scan in which:

the beam diameter is greater than the width S, and the beam intensity is below a machining intensity threshold;

whereby a machined formation is cleaned.

In one embodiment, the method is performed to machine through channels to singulate die.

In another embodiment, the semiconductor material is a substrate for a micro-fluidic device.

In a further embodiment, a trench is formed in a surface of the substrate, the trench being suitable to act as a fluid delivery channel of a micro-fluidic device.

In one embodiment, the number of scans and lateral offsets of the scans is varied so that a tapered structure is formed in the material.

In another embodiment, a tapered structure is formed in a circular or elongated aperture.

In a further embodiment, a plurality of tapered structures are machined to form wells, funnels and through hole channels of the micro-fluidic device.

In one embodiment, the material is machined from a top side, and subsequently from a bottom side, the formations from the sides joining to form a single through formation.

In one embodiment, a top side camera and a bottom-side camera are aligned and calibrated such that a transformation mapping coordinates of the top camera to coordinates of the bottom camera is known, and the top side and bottomside material coordinates are registered with respect to each other for registration of machining on both sides.

In one embodiment, machining of the material from both sides enables the formation of curved and tapered elongate and circular wall structures.

In another embodiment, a fume extraction head is used for extraction of fumes and solid debris from above and below the material, and wherein assist gas is directed at the material to control the deposition of debris and assist the machining process.

According to another aspect, the invention provides a laser machining apparatus comprising a laser source, means for directing a laser beam from the source at a semiconductor material to machine with a kerf K to a width S, and a controller for controlling parameters of the laser beam, characterised in that, the controller comprises means for directing the laser beam in a plurality of n parallel passes, said passes being laterally offset, and wherein n is greater than or equal to S/K.

In one embodiment, the controller comprises means for controlling laser beam intensity ($I_B$) so that it lies in a range of values of intensity for which material removal rate increases with increasing intensity.

In one embodiment, the laser machining apparatus further comprises a fume extraction system having suction inlets above and below the material support means.

In one embodiment, the laser machining apparatus further comprises a gas blowing system comprising nozzles for directing an assist gas over the material being machined.

In another embodiment, the laser machining apparatus further incorporates a vision system which consists of top and bottom camera systems in registration with each other, and a controller comprising means for using images from the cameras to ensure registration of the material after flipping.

DETAILED DESCRIPTION OF THE INVENTION

Brief Description of the Drawings

The invention will be more clearly understood from the following description of some embodiments thereof, given by way of example only with reference to the accompanying drawings in which.

Description of the Embodiments

Figure 1:
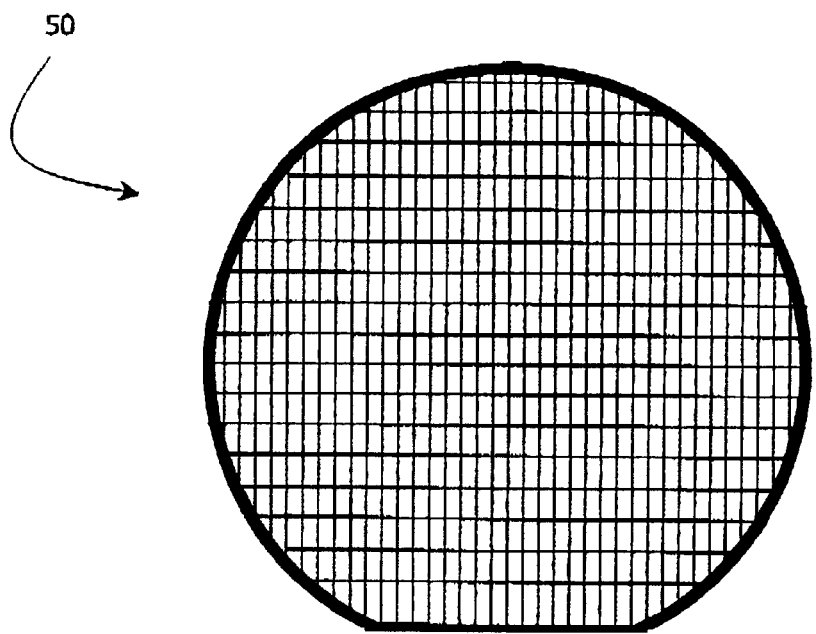
FIG. 1 is a plan view of a silicon wafer showing a cut pattern.

The invention provides a system and method for micro-machining semiconductor wafers by means of UV and visible light induced photo-ablation and other fundamental physical processes. The laser systems are diode pumped solid state laser systems e.g. (Nd:YVO$_4$@1064 nm) with second (532 nm), third (355 nm) or fourth (266 nm) harmonic emissions. In particular 532 nm and 355 nm lasers provide good speed with acceptable quality and 266 nm systems provide good laser machining quality. Depending on the exact wavelength of the emission the harmonic wavelengths may also vary slightly (e.g. Nd:YAG). The system allows for complicated shapes, blind and cut-out, to be machined on both sides of semiconductor wafers at high speed. The method employs a laser source and an accurate scanning and positioning system that involves a high resolution xy stage and a two-axis galvanometer. A high-resolution two-camera imaging system is used for the accurate positioning of the wafer and the inspection of the micro-machined features. A topside vision system is used to provide positional information to a central processor. This vision system operates when the wafer is in the "artwork up" position. The topside vision system may be at a fixed offset to the laser beam positioning system, or the vision system may operate through the beam delivery path and focusing lens. The material handling system is designed to allow a wafer to be placed in an xy table chuck with artwork facing upwards or downwards. A bottom side vision system is used to provide positional information for wafers with the artwork facing downward.

The system also includes a sophisticated gas blowing and debris extraction system. The debris extraction device ensures that debris does not land on fiducial locations so that accurate vision and alignment is possible. The gas assist device ensures that debris is directed away from the machining front and from the topside of the wafer into a debris extraction system. The gas assist device also improves machining speed when the gas jets are directed along a cut.

In one embodiment, a pulsed UV laser source of average power larger than 4 Watts is used for the laser machining. The beam is delivered to the wafer using dielectric mirrors designed for the appropriate wavelength, laser power, polarisation and angle of incidence. A beam expander can be used to set the diameter of the beam at the input to the galvanometer. The beam is then directed into a two-axis galvanometer. Attached to the galvanometer is a telecentric f theta flat field lens that delivers uniformly a focused beam to an area of up to 100 mm by 100 mm. In order to machine the whole area of the wafer, an x-y stage is used. This x-y stage incorporates a wafer holder. The x-y stage can be controlled to connect areas outside the galvo field of view to enable machining of long channels across the entire wafer. A handling robot is used to position the wafer in the xy table with artwork facing upward or downward as required. This allows the wafer to be machined on both sides. The wafer holder is designed for a wafer of specific diameter. It can however be easily changed to accommodate wafers with smaller or larger diameters including 200 mm and 300 mm wafers. Two high-resolution cameras, one at each side of the wafer are used for the alignment of the wafer and the inspection of the machined structures. A gas blowing and a debris-removing system assist the laser machining process.

All control systems, data systems, motion systems, vision systems and beam delivery are processor controlled.

Figure 2:
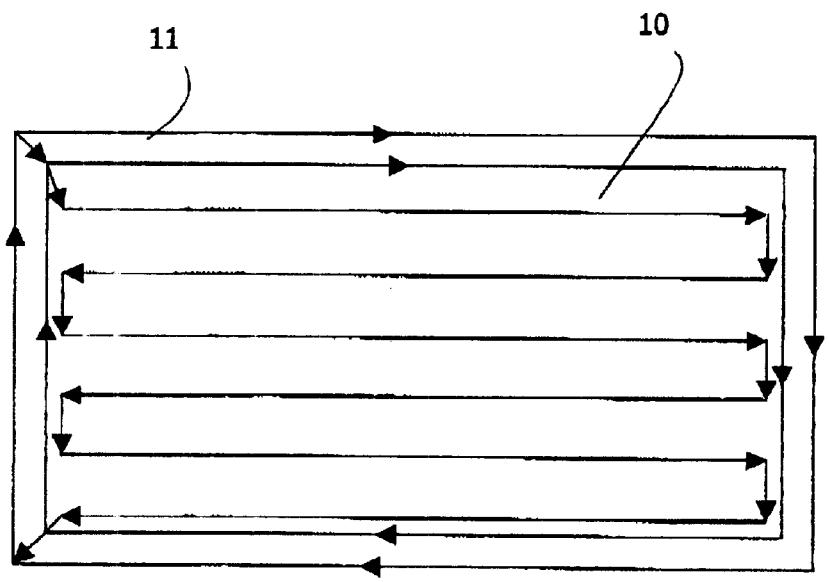
FIG. 2 is a diagram illustrating machining directions using a window strategy and a raster strategy.

An example of a semiconductor wafer 50 is shown in FIG. 1, in which a wafer pattern is divided in rectangles. Other applications such as array waveguide grating singulation may require machining a curved structure. An example of a cutting pattern, a long through hole channel, is shown in FIG. 2. It can be seen that the channel is machined using a combination of rastering 10 and window 11 cutting.

A limitation on the material removal rate from silicon and other semiconductor materials is that the basic rate of material removal decreases as a function of depth into the substrate. Accordingly, scanning a high power laser across the surface of a substrate results in a specific material removal rate. Scanning further downward in the same location results in a decreasing material removal rate.

The reduction in material removal rate is due to several factors. Beam attenuation by airborne debris, debris condensation on the side wall of the channel resulting in shape modification, and beam attenuation by condensed debris all contribute to the reduction in machining rate.

To increase the overall machining speed the invention reduces these effects. Effective means to do this are to make the channel wider throughout the drill process from top to bottom, to use assist gas, and to drill the wafer from each side such that the aspect ratio of each channel is low.

An objective of machining is to machine through the wafer at the highest speed possible while meeting the required specification for edge smoothness and without reducing the mechanical strength of the wafer or substrate material. Causes of damage include excessive thermal loading of the wafer. To provide high speed micro-machining and profiling, it is necessary to control the base set of laser and scan parameters and to provide a controlled machining strategy which results in a net increase in the speed of machining without thermally loading the wafer and without generating chips and cracks in the wafer. To this end, straight wall or curved wall structures may be defined by iteratively machining from top to bottom. More generally, full 3D profiled micro-machining, and methods to achieve such structures, are described in the context of the wafer parameters, laser parameters, hardware and laser scan parameters that contribute to the improvement in the machining process and speed.

Finally, to provide scalability of the speed of machining with laser power the invention optimises parameters at the highest available power so that this additional power can be exploited for increased speed without affecting the resulting wafer quality To describe these principles it is useful to initially define the parameters.
Wafer parameters
   Kerfwidth (kerf, K)

Figure 3:
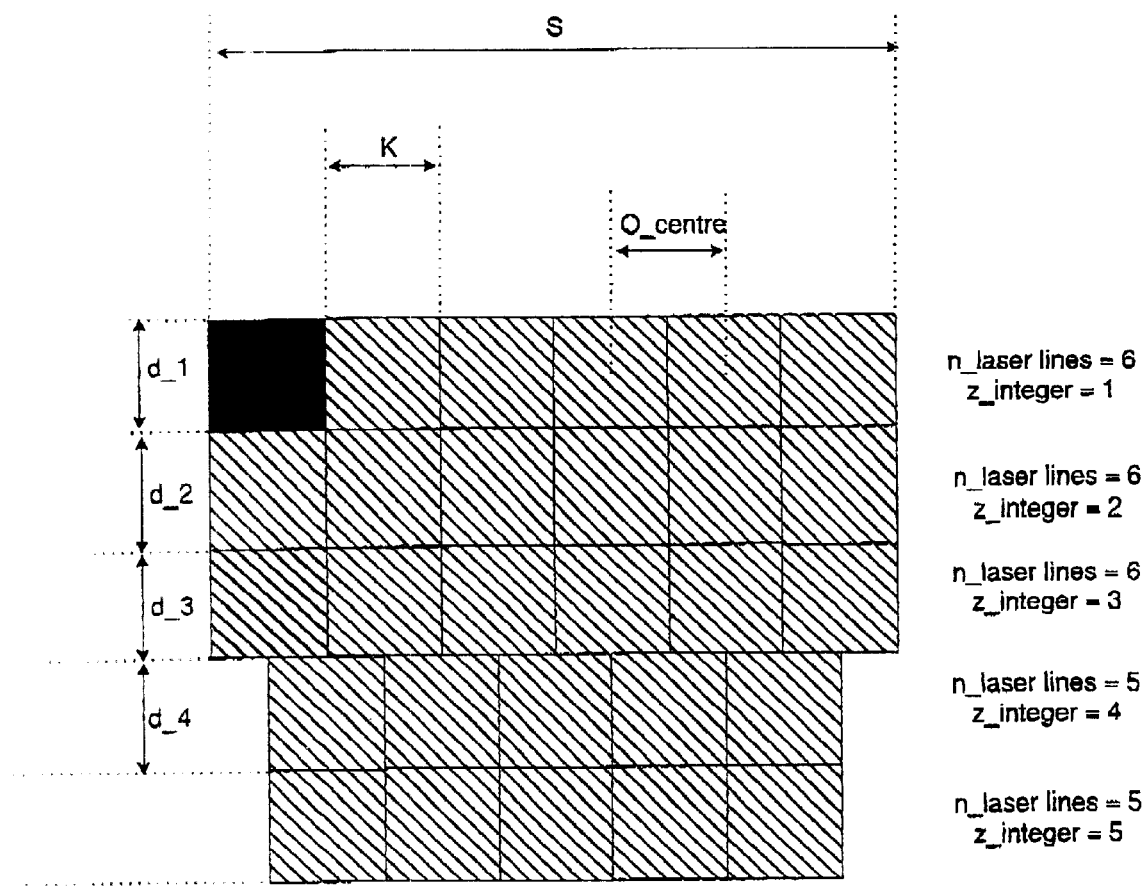
FIG. 3 illustrates a five-step machining process to remove a volume of material, illustrating parameters such as the dimension of kerf, K, and the width S of a trench formed by a laser beam of width w, where w is the "1/e squared" diameter width of the Laser beam.
Figure 4:
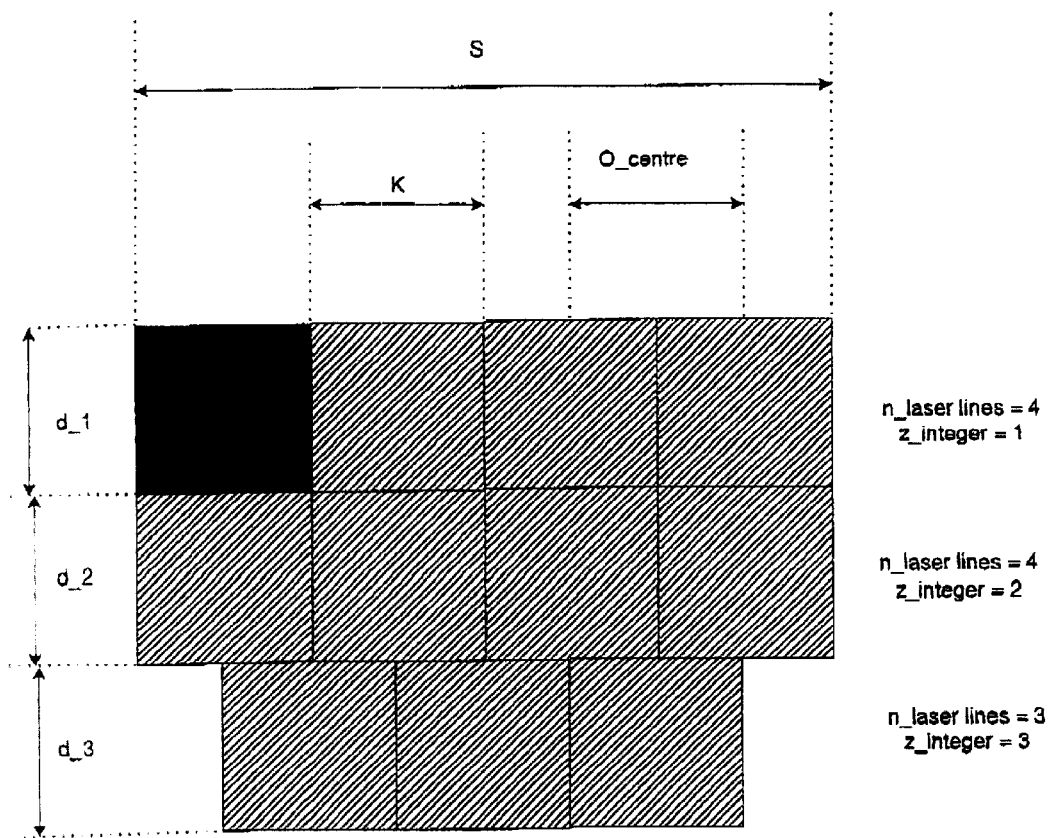
FIG. 4 is a representation of an alternative set of variables required to remove a similar volume as depicted in FIG. 3 in three steps.

The kerf is the width of the trench (in microns) defined by the laser during a single scan across the wafer surface. The value will vary according to the laser power, beam diameter and other parameters. This is measured by the user. It is illustrated in FIGS. 3 and 4.
   Channel Width (S)

This is the target width of the channel (or trench) in microns and is also illustrated in FIGS. 3 and 4. The channel width is derived from a CAD input, and is defined by the number of laser lines(n_laser lines), lateral offset between these lines (O_centre), and the kerf. In the case where the offset (O_centre) equals the kerf width (K) this reduces to S=kerf*n_laserlines.
   Number of Passes (z-integer)

The total number of scans of laser lines over the same location resulting in increased machining depth at that location. The total number will determine the depth and profile of the channel that is etched. FIG. 3 illustrates a machining process in which z-integer=5.
   Number of Laser Lines (n_laserlines)

Figure 5:
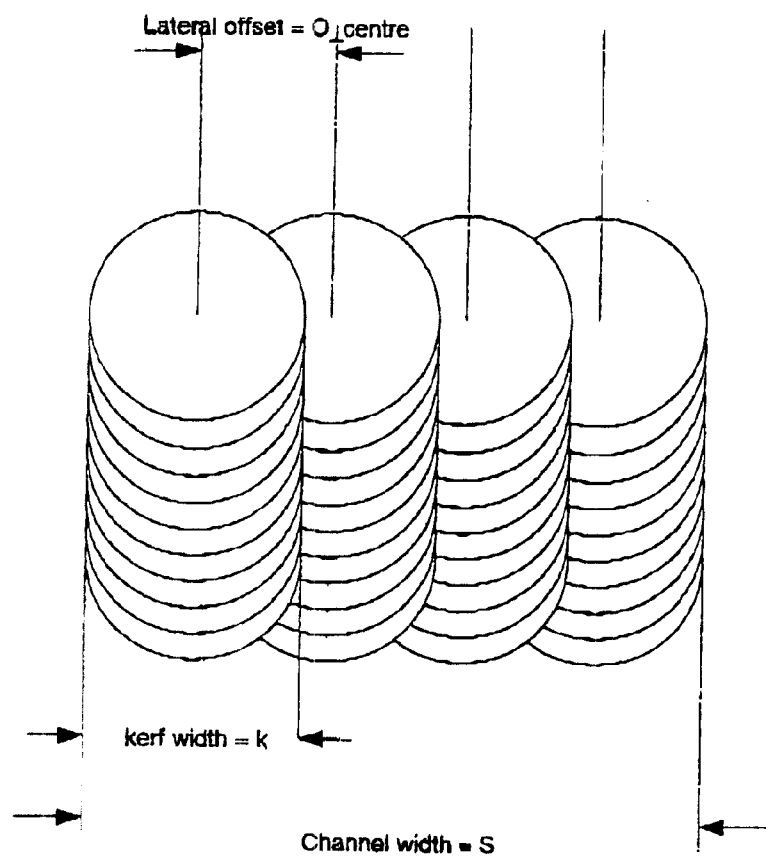
FIG. 5 illustrates a typical map of laser pulse spatial positioning.

The number of scans of the laser across the width (S) of the channel. As shown in FIG. 5 n_laserlines has values of 6, 6, 6, 5, 5 for the five layers in order from top down. In the case of FIG. 3 z_integer is 5 and in FIG. 4, the z_integer is 3.
   Offset Between Lines (O_centre)

The centre-to-centre distance between consecutive laser lines etched along the channel. This is represented in FIGS. 3 and 4. In the representation O_centre is approximately the kerf width but may be any value. The lateral offset (O_centre), number of parallel laser lines (n_laserlines) and kerf (K) define the channel width (S). The values may be changed for each layer during the machining process to create tapered structures such as funnels, wells, through-holes, and channels.
   Scan Velocity (v_galvo)

The velocity of the beam on the substrate due to the scanning motion of the galvo.
Optical Parameters
   Beam Diameter Beam diameter refers to the 1/e squared diameter width of the spatial intensity profile of the laser. In silicon, the kerf width, K is a function of the beam diameter at focus. Beam diameter is a variable that can be controlled through selection of the focusing lens, scanlens or through the use of a beam telescope. The effect of modifying beam diameter is to modify the power density levels at focus.

Peak power density (Intensity $I_B$) Peak power per unit area. Peak power is determined by energy per second. Accordingly peak power density is defined by $$P.P.D. = \frac{E}{\Delta t \cdot A}$$

Where E is energy in Joules, $\Delta t$ is the pulsewidth in seconds and A is area in centimetre squared and the peak power density is in Watts per centimetre squared. In this specification the peak power density (intensity) of a beam is represented by "$I_B$".
   Energy Density Energy Per Unit Area (Fluence)

$$E.D. = \text{Fluence} = \frac{E}{A}$$

Where E is energy in Joules and A is area in centimetre squared. The units of energy density are Joules per centimetre squared.

Laser Energy and Power Output

Typically, Q switched laser systems show an average power maximum output at a specific repetition frequency. Below this repetition frequency, individual pulse energies can be higher than pulse energies at maximum average power. At repetition frequencies above this, individual pulse energies are lower but the number of pauses delivered per second is higher. These facts have an impact on machining. In particular, the energy density dependence of the material removal rate can dictate that the optimum machining rate for a given beam diameter at focus, may occur at a repetition frequency higher than the repetition frequency at which the laser average power is maximum. Therefore, optimum machining conditions may occur at an average power output that is lower than the maximum.

Depth of Focus

The depth of focus for focused beams from second, third and fourth harmonic YAG, YLF and vanadate type lasers is larger than in multimode lasers and in lasers with large M squared values. This is primarily because the spatial output form YAG, YLF and vanadate lasers is Gaussian. This is to advantage in that machining of thick wafers is possible as generally, the wafer thickness is such that it can be placed at a fixed distance from the working lens without repositioning to compensate for defocusing effects.

Furthermore, the position of the machining relative to the plane of focus can be controlled th rough moving the sample through the focused beam or by adjusting the focusing optics manually or with an autofocus system. This may be required for small focused beam diameters.

Overlap

The overlap is defined as the percentage of the beam diameter that overlaps spatially with the diameter of other pulses in sequence as the beam is scanned in a particular direction, as illustrated in FIG. 5:

$$\text{Overlap (\%)} = \frac{\text{focused beam diameter} - \left[\frac{\text{scan velocity}}{\text{repetition rate}}\right]}{\text{focused beam diameter}} \times 100$$

Spatial overlap is a parameter that contributes to an improvement in machining speed.

Machining Speed and Drill Strategies

The number and the length of the rastering beams depend on the width and the length of the desired micro-structure. The distance between the rastering beams depends on the dimensions of the focused laser beam. The speed at which the beam is scanned depends on the dimensions of the focused beam and the repetition rate of the laser, as it is these factors that govern the spatial overlap between each laser spatial pulse profile.

The basic criterion on which the machining speed is improved is that by etching the channel width to allow escape and forced removal of debris, the overall "cut rate" is increased. The cut rate is defined by the scan rate divided by the number of passes required to achieve the cut. This can be represented formally by the expression:

$$V_{machining} = \frac{v_{galvo}}{z_{integer} \cdot n_{laserlines}}$$

where v galvo is the galvo scan velocity, z_integer is t he number of depth wise passes and n_laserlines is the number of laser line widths that form the channel width as described above.

To machine a channel between two adjacent die on a semiconductor wafer a volume of material in the channel (street) between must be removed. The speed at which this process can be conducted is a function of the laser parameters, the optical properties of the beam, the material properties, and the machining strategy used to remove the material. The machining strategy may require the laser, optical or scan parameters to change throughout the machining process.

Figure 6:
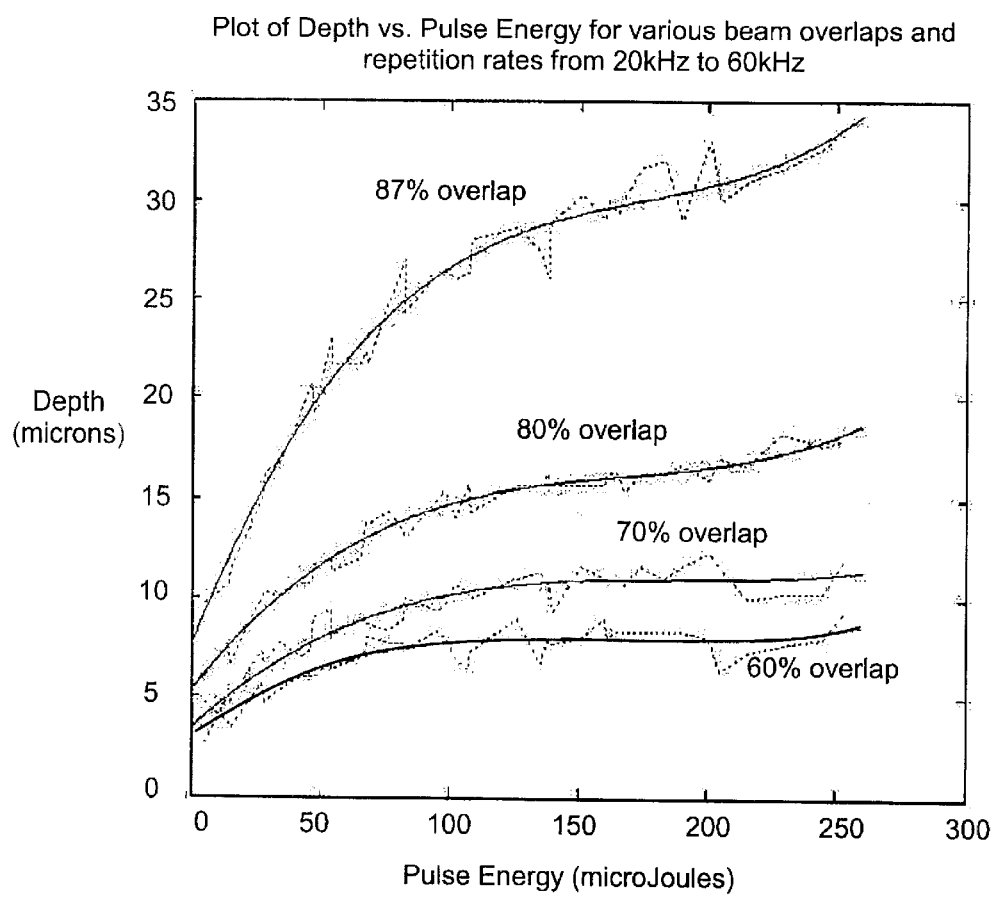
FIG. 6 is a set of plots of material removal rate vs. beam energy for a fixed beam diameter and with various overlaps.

Referring to FIG. 6, a set of plots is illustrated for material removal rate (depth of cut) vs. energy of the beam used. It will be observed that there is increasing depth with increasing energy in an approximately linear relationship for an energy range of 0–140 $\mu J$. The linear relationship ranges are used for machining. These increasing linear, near linear or super linear relationships may also exist at higher pulse energies.

For a single channel machined with a given beam diameter, the depth of the channel increases with increasing energy. The amount of the increase in depth as a function of the increase in pulse energy depends on the actual energy density. For maximum machining rate in blind and through holes it is critical to utilise the beam diameter where the energy density dependent machining rate is not saturated.

In FIG. 6 the effective "non-saturated" energy density range is from ~10 $J/cm^2$ to ~62 $J/cm^2$ corresponding to peak power densities in the range from 5.5×10⁹ $W/cm^2$ to 3.4×10⁹ $W/cm^2$ for a 355 nm Q_switched laser source with a pulsewidth of 18 ns machining in Silicon. Increasing the pulse energy beyond these values results in a minimal increase in the machining depth and accordingly, in the net machining rate.

Under similar conditions the shape of the curve and the energy density and peak power density values for which machining is optimised vary. Furthermore, the range of values differs for each different machining wavelength.

Finally, the parameters that lead to the optimisation of energy density and peak power density depend on the laser source pulse energy, the variation in the output laser average power and pulse energy with pulse repetition rate, pulse width, beam diameter and the material response to increasing energy and power density.

Also, there exists an optimum overlap between pulses where this relationship is favourable towards more efficient machining. In FIG. 6 this optimum is 87%. Generally, the preferred overlap region for through hole machining is in the region of 70 to 98%. At these overlap values, the thermal contribution to machining is significant, however, it has little impact on active device functionality as heat is localised. Where the thermal effects do have an impact is in the generation of molten debris. For through hole or channel machining, this debris can be removed through the use of "cleaning passes" which may occur at higher scan velcity or lower power or both. Generally, for "clean" channels higher speeds are preferred and overlap below 80% provides more uniform channels.

In another embodiment, channels, through holes and micro-machined features formed as described above may require further cleaning or etching steps. Typically, the etching mechanisms include wet and dry etch methods using KOH, TMAH, BHF, $SF_6$, $CF_4/O_2$ and others. Using laser and chemical/dry etch techniques, the versatility, simplicity and speed of laser based techniques can be combined with the exceptional finished quality of chemical etch techniques to provide a powerful prototyping tool with real prospects for semiconductor and micro-fluidic device manufacturing technology.

In the example shown in FIG. 6, the favoured area of operation is up to 140 micro-Joules at 355 nm. For a beam diameter obtained with a 100 mm focal length f theta telecentric lens (theoretical beam diameter 17 microns) this energy density is efficient for machining silicon.

For optimum machining the beam is scanned n_laserlines times for a given value of S, n_laser lines being an integer greater than or equal to 1. Where n_laserlines is greater than 1, the second and any subsequent lines are parallel to the preceding scans and are laterally offset. In general n_laserlines $\geq$ S/K is required to achieve the target channel width S. The degree of lateral offset, O_centre, determines n_laserlines and is, in turn, determined by the peak power density (intensity $I_B$) of the beam and other parameters. Also, $I_B$ is chosen to be in one of the range s for linear relationship with increasing material removal rate for the particular semiconductor material.

The pulse overlap is a function of v_galvo, the laser repetition frequency, and be am diameter. It is preferably in the range of 70% to 95%.

The overall net machining speed is v_galvo/n_laserlines*z_integer. To maximise machining speed it is necessary to maximise the galvo velocity (v_galvo) and minimise the values of n_laserlines and z_integer such that an acceptable feature quality is achieved.

The lateral offset (O_centre) is also chosen for any step in the machining strategy to achieve the desired channel or trench side wall profile. Thus, where the side walls are to taper inwardly, and downwardly, the O_centre value may be decreased for each successive step to approximate this profile. In the example of FIG. 3 such a taper is achieved by reducing n_laserlines, but it could alternatively be achieved by decreasing O_centre. Although the variation may appear step like in a geometric layout, the actual resulting wall profiles can be made continuous by appropriate choice of parameters.

Where a through channel (slot) is being machined and it is desired to have curved and inwardly tapered walls at both the top and bottom of the channel, the substrate may be flipped and machined from the opposite side. Registration is ensured by use of both top and bottom cameras.

To ensure accurate registration it is necessary to compensate for differences in field lighting, magnifications, and exposures between camera systems through calibration. There is also calibration of the relative offsets and skews between the cameras. This may be achieved by imaging a target with position calibrated through-holes and using the appropriate transform to map between imaging planes. Generally, an array of three holes distributed throughout the field of view is sufficient to ensure accurate registration.

In one embodiment the camera is offset at a fixed distance to the galvanometer and therefore the beam position. This fixed offset is susceptible to thermal fluctuations and vibration. To counteract the thermal shift it is necessary to provide feedback. This is achieved through measurement of a machined through-hole feature with respect to a fiducial. Offsets in the through hole position, with respect to the expected position, are fed into the system as a correction. The position is measured with a through hole vision algorithm acting on an image acquired by one camera.

Alternatively, in a second embodiment, the vision system is aligned to view through the beam delivery head. This requires that the optical path is designed for a viewing channel wavelength appropriate to the sensor spectral response FIGS. 3 and 4 illustrate how different values of n_laserlines and z_integer achieve an approximately similar sized trench, where different beams with different kerf values are used.

Figure 7:
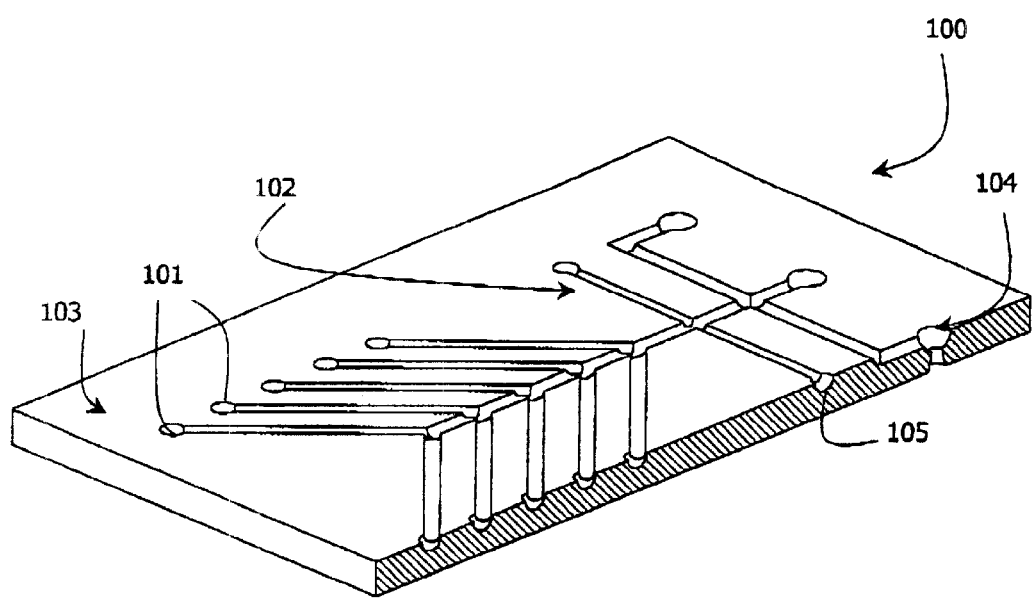
FIG. 7 is a perspective view of a microfluidic device machined according to the invention with surface trenches connecting through-holes, wells, and funnels.

Machining control according to the invention may be used to machine microfluidic formations in semiconductor substrates. Referring to FIG. 7 a microfluidic device 100 comprises through-hole apertures 101 and a network of micro-trenches 102 in a semiconductor substrate 103. The apertures 101 allow liquid to flow though the substrate to complete a flow network. The microfluidic circuit also comprises funnels 104 and wells 105. Tpically, the trenches and apertures have a width in the range of 1 to 200 microns, and more generally they may be in the range of 0.1 microns to an arbitrary maximum. The depth of the trenches is controlled through control of the laser and scan parameters. The width of the trenches is controlled by moving the sample through the focal plane to achieve larger or smaller kerf widths. Alternatively, the beam focus can be moved or changed using in-line beam optics.

The ability to machine both sides of the wafer coupled with registration of top to bottomside positions, enables machining of complex tapers and through hole features such as funnels.

Figure 8:
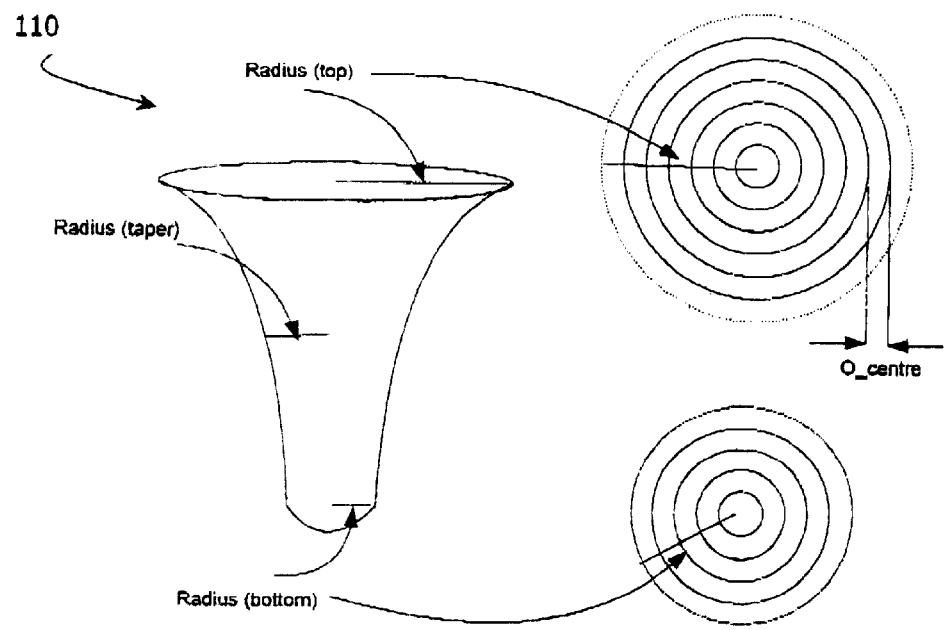
FIGS. 8 to 13 are diagrams illustrating machining of various microfluidic device features/formations.
Figure 9:
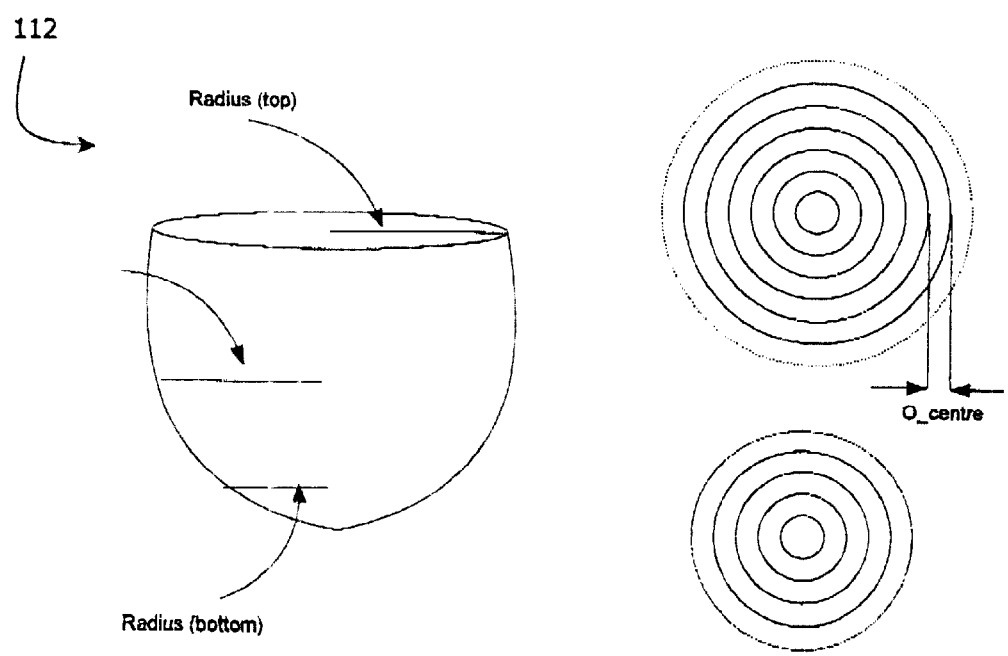

The drill strategies required to fabricate these structures may be understood with the assistance of FIGS. 8 to 13. In FIG. 8, a blind hole or "well" structure 110 is illustrated, with a concave taper. The concave structure may be formed by varying the values for the lateral offset, O_centre from one scan to the next, and the number of parallel laser lines, n_laserlines, at each step downward when machining from one side. Likewise for a convex well, 112, as illustrated in FIG. 9.

Risk of damage to the substrate (in the form of chipping) is minimised if machining takes place on both sides of the wafer.

Figure 10:
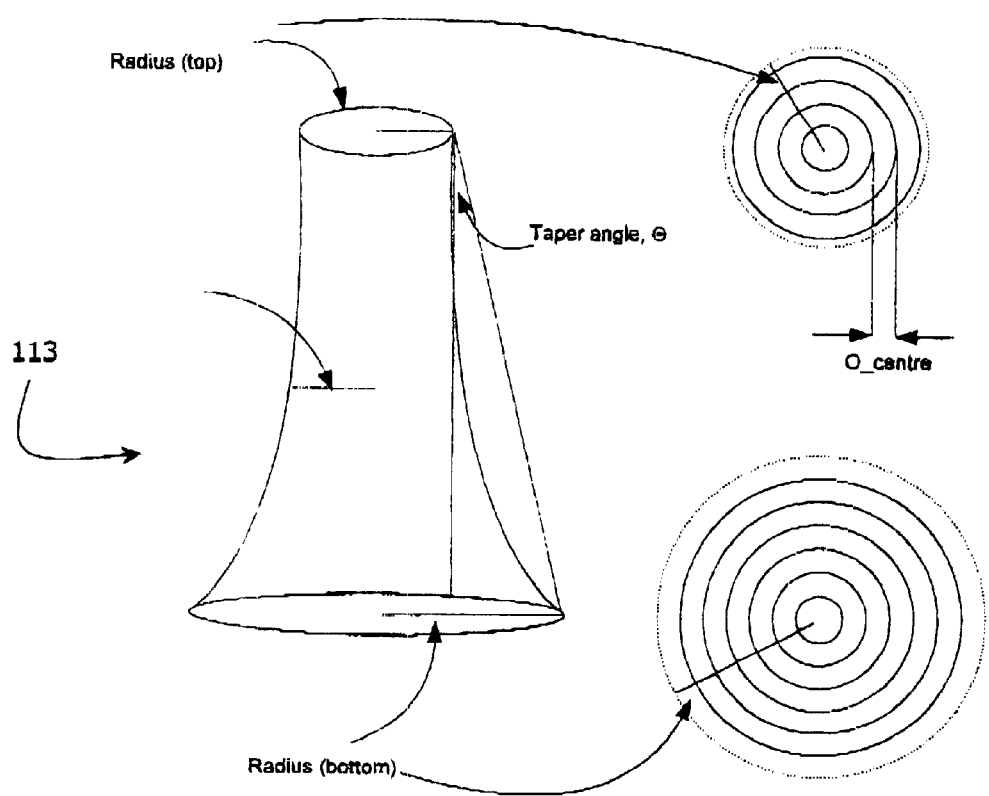
Figure 11:
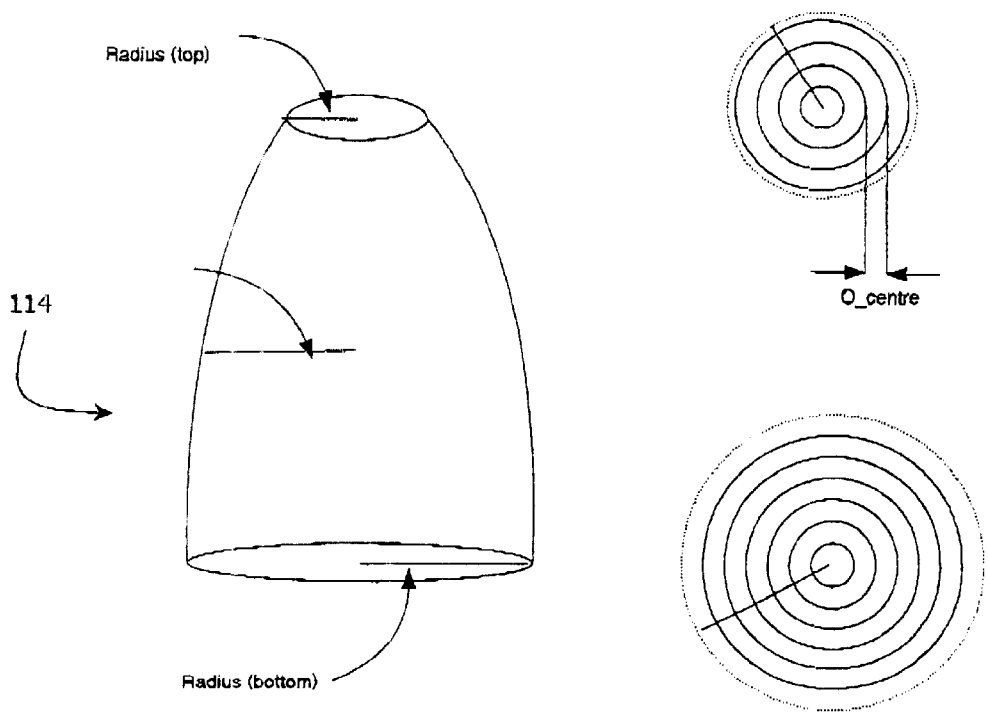

A funnel shape is dictated by choice of n_laserlines and O_centre and a concave funnel 113 is shown in FIG. 10. If machining takes place from one side only, a convex funnel 114 is possible (FIG. 11).

Figure 12:
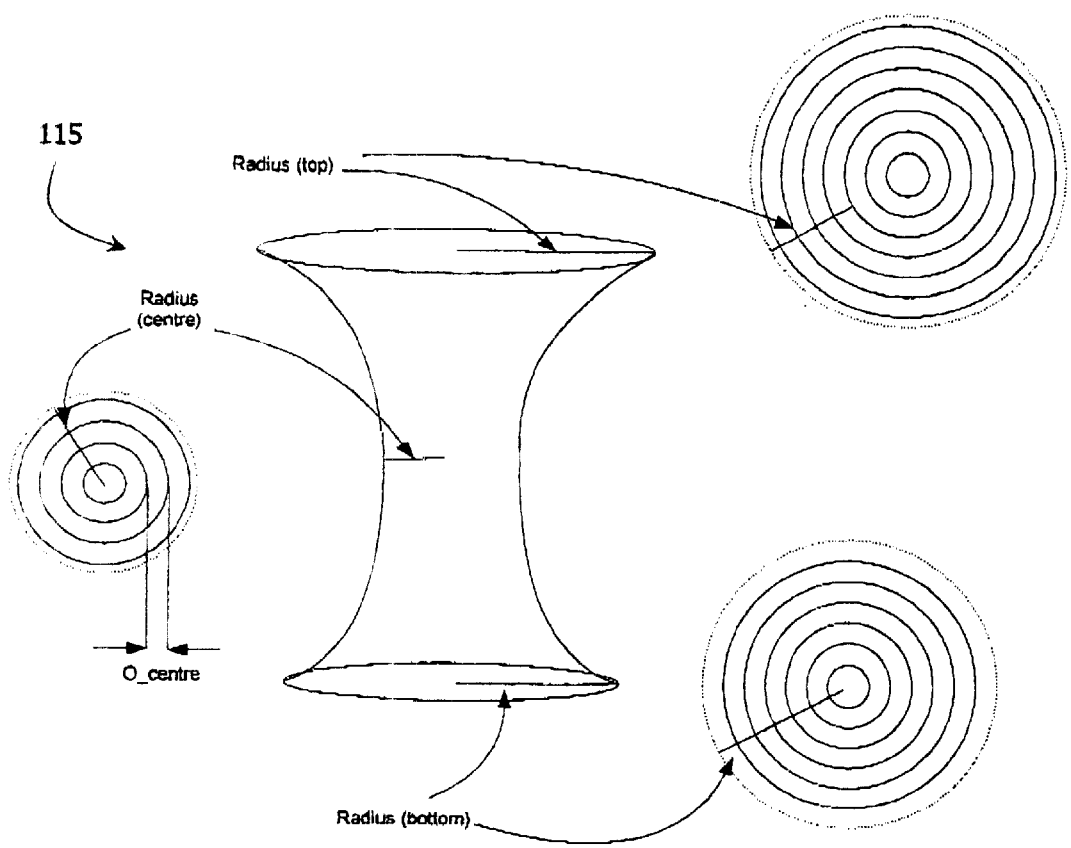

Finally, a Funnel 115 with a dual-sided taper is possible by machining from both sides of the wafer with correct n_laserlines and O_centre from each side (FIG. 12).

Figure 13:
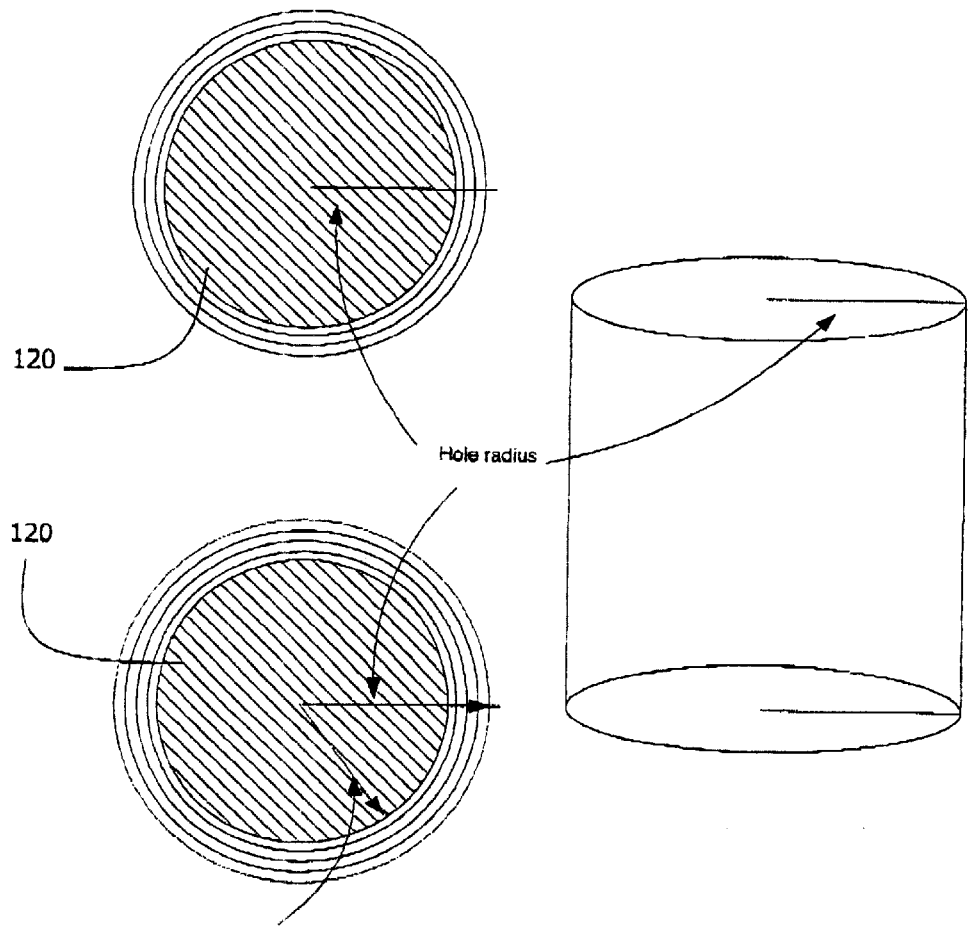

FIG. 13 illustrates the simple case where an ingot 120 is removed. In the case where the radius is significantly larger than 300 microns it is necessary to use a window to remove the ingot. This is equivalent to removing a semiconductor die and the total machining speed is determined by the perimeter length and the machining speed for the channel.

A plate or wafer may be subsequently bonded to or grown onto the substrate to cover the channels so that they are internal, and fluid access is provided by through apertures or funnels in the substrate or the plate, thus forming the complete device structure.

Figure 14:
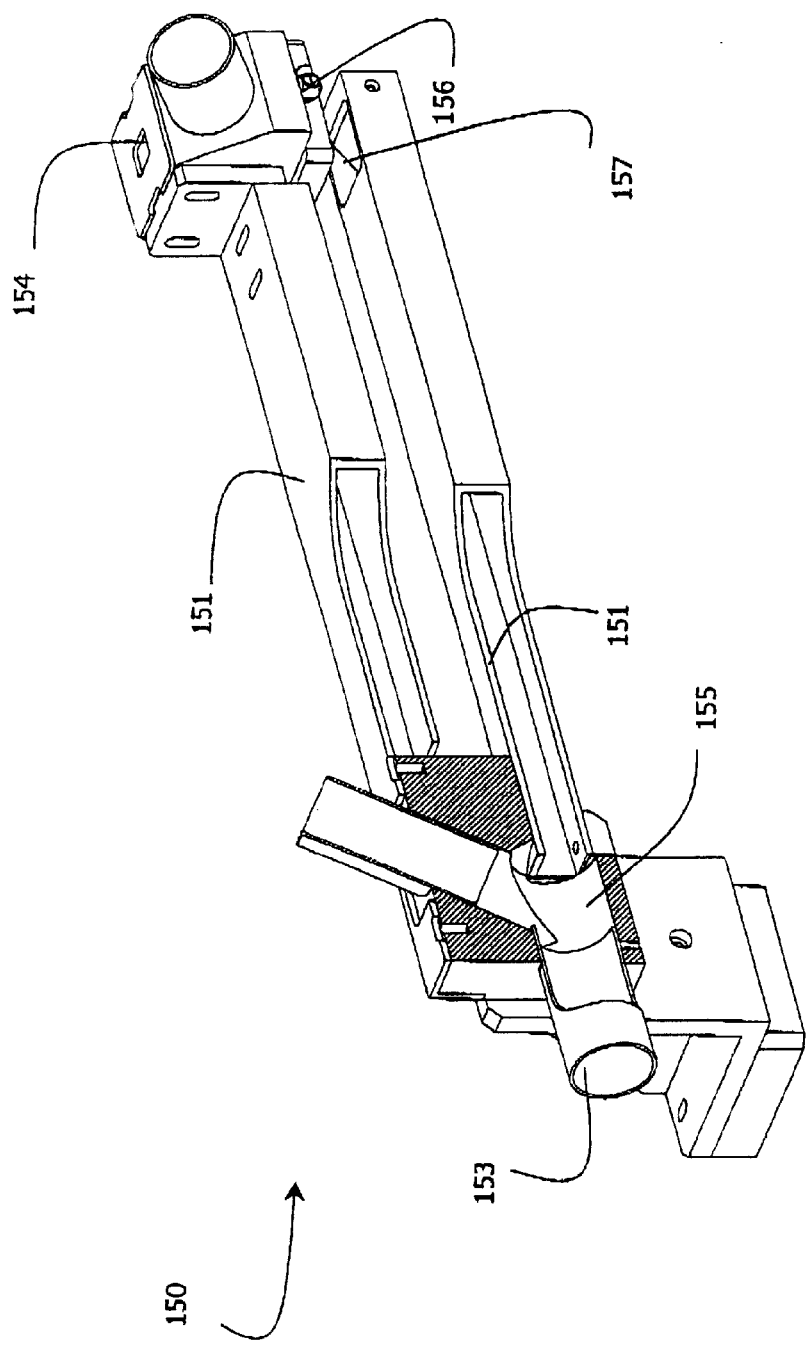
FIG. 14 is a perspective partly cut-away view of a fume extraction and gas assist apparatus used for laser machining.
Figure 15:
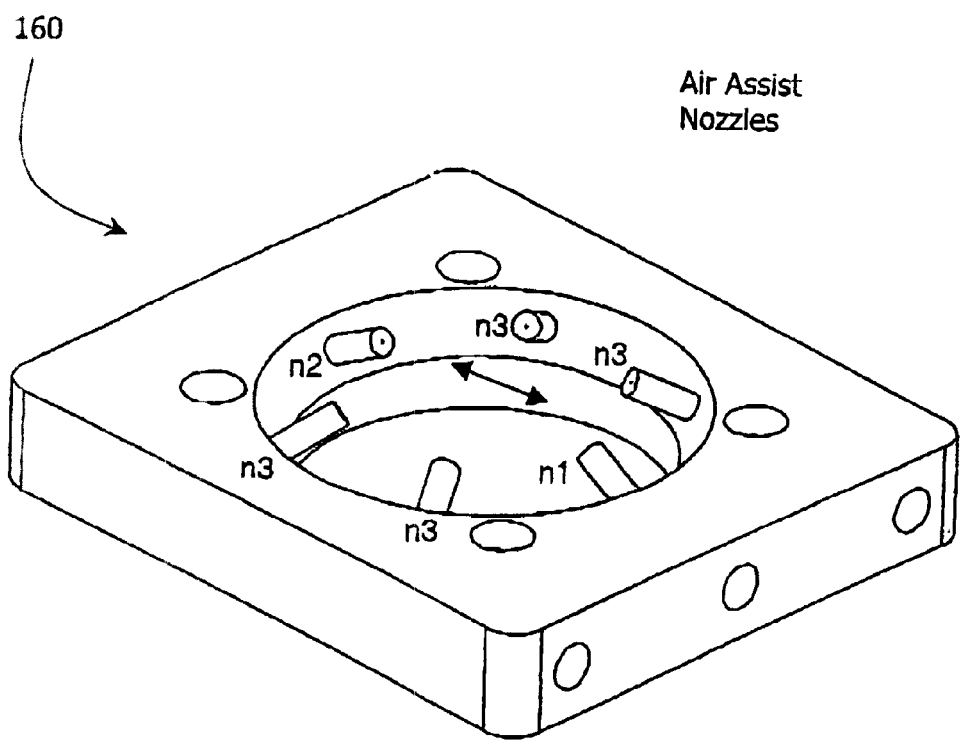
FIG. 15 is a more detailed view of a gas assist part of the apparatus.

Referring to FIGS. 14 and 15, a fume extraction and gas assist apparatus 150 for the system is illustrated. The laser machining generates particulate and gaseous debris. In particular, the process of laser machining through the use of high peak power Q switched laser beams, results in the generation of large amounts of sub-micron and micron sized particles as well as various gases and chemical emissions. This debris is removed from the machining region for disposal using the apparatus 150.

The apparatus 150 comprises two arms 151. The wafer is mounted between the two arms at the right hand side as viewed in FIG. 14. The laser beam passes through the top aperture and another aperture in the top arm to reach the material. Debris removal is initially primarily from the top, and as the beam cuts through the material it is from the bottom. The lower arm carries debris and gas to an outlet 153 from the bottom of the wafer. The upper arm 151 carries debris and gas to an intersection 155 with the lower arm and both are fed to the outlet 153. Gas and debris are removed from the machining front on the wafer through suction inlets 157 above and below the wafer. Suction is from the outlet 153 by means of a downstream fume extraction pump. A feature of the apparatus 150 is that it operates without attenuating the beam as it is delivered over the scan area. Accordingly, the inlets 154 and 157 are designed such that when the wafer is at a specified height, there is a net flow of air into the extraction system. The extraction is required to prevent deposition of debris on active or sensitive materials on the wafer surface and on optics. This is to prevent damage and to ensure that debris does not impede inspection of fiducials for alignment. Finally, the extraction system also provides a means to assist the machining process itself.

Another feature of the apparatus 150 is that it has the capability to deliver an assist gas to the machining front to aid the machining process. The apparatus 150 has a gas assist system 160 mounted in a support 156. The location is above the location of the semiconductor in use. The gas assist system 160 is shown (inverted) in FIG. 15. In the particular case where the machining direction is along the direction of n1 to n2, the nozzles n1 and n2 provide air assist parallel to the channel and shift the debris away from the laser focal point. The nozzles are on separately controlled air lines and the flow rate through each is independently controllable.

In the example of cutting in the direction along n1 to n2, the four nozzles marked n3 are branched off equally from a single air line. They form an air curtain around the cut and are for containment of the debris. They also contribute to the upward draft of air that pulls the debris into the extraction system. For cutting along alternate directions, for example the perpendicular direction to the direction between n1 and n2, additional nozzles can be added and the air flow switched according to the direction in which the cutting takes place.

Returning to the laser beam control, the following are specific examples of control parameters and resultant machined formation parameters.

EXAMPLE 1

Machining a 200 Micron Channel in Silicon

Figure 16:
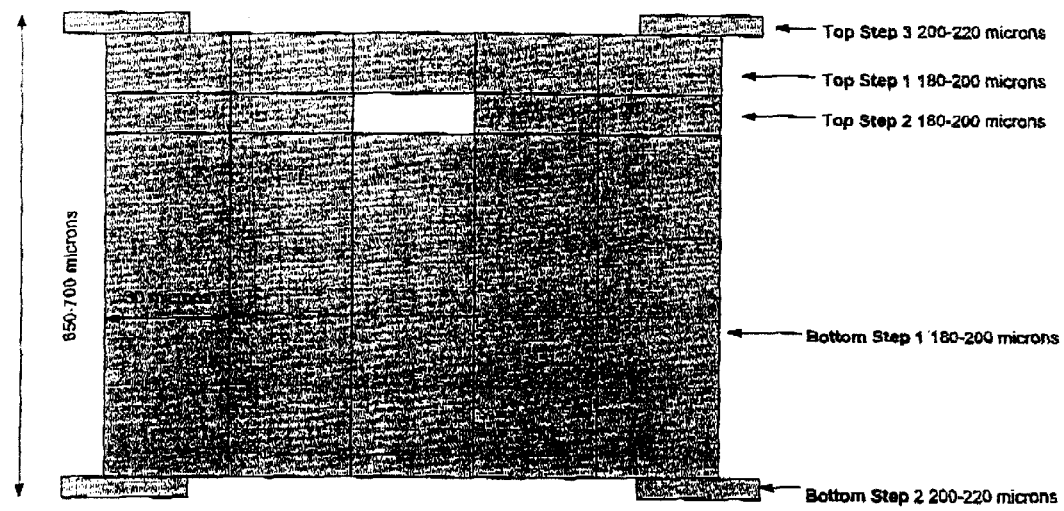
FIG. 16 is a diagrammatic side view of a channel machining strategy.

FIG. 16 is a graphical example of the drilling strategy applied to cut a 200 micron wide channel with a 355 nm laser system at a specific power level. The channel is cut by cutting mostly from the bottom of the wafer, and then completed by turning the wafer over and finishing cutting the channel.

This ensures maximum speed and highest cut quality. The wafer is cut from the bottom in two steps, Bottom Step 1 is for drilling the bulk of the channel, and Bottom Step 2 is a fast scan around the channel for cleaning any residual material. The wafer is cut from the top in three steps.

Top Step 1 is for drilling the bulk of the channel.

Top Step 2 is applied for removing residual material that remains on the inside of the channel wall after machining from the bottom.

Top Step 3 is a fast scan around the channel for cleaning and removal of residual material.

Figure 17:
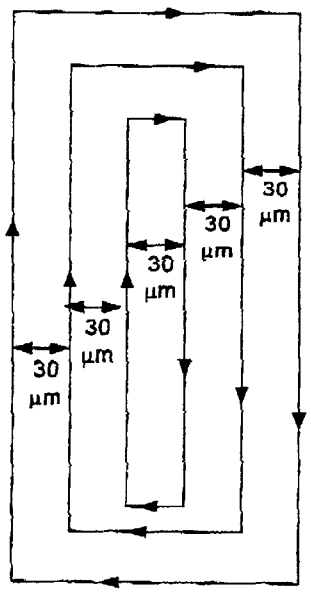
FIG. 17 is a diagram illustrating window machining paths for one step (top step 1) in this channel.

The path the laser beam follows in Bottom and Top Step 1 is shown in FIG. 17. For the other steps, the path is varied accordingly.

As it can be seen, for specific 200 micron channels the laser is scanned along the length of the channel 6 times, at 30 micron steps.

In the 200 micron channel case we use a lateral offset, $O_{centre}$=30 microns because we have found that this is the optimum value for the laser parameters used in this instance, for maximum machining speed.

We can vary the number of parallel laser lines, $n_{laserlines}$ to drill channels of different widths. For a given channel width S and an optimum $O_{centre}$ the $n_{laserlines}$ is given by the relation $$n_{laserlines} = \left| \frac{S - kerf}{O_{centre}} \right| + 1$$

where the straight brackets indicate the higher integer value of the fraction (i.e. rounded up), kerf is the width of the trench (in microns) as defined previously. If the channel width is equal to the kerf the value of n_laserlines is equal to 1.

In the majority of case $$\frac{S - kerf}{O_{centre}}$$

will not be an integer. In this case, either one $O_{centre}$ value must be smaller, or all $O_{centre}$ values must reduce to fit the required number of laser lines. The new value of $O_{centre}$ is then given by the relation.

$$O_{centre} = \frac{(S - kerf)}{(n_{laserlines} - 1)}$$

Figure 18:
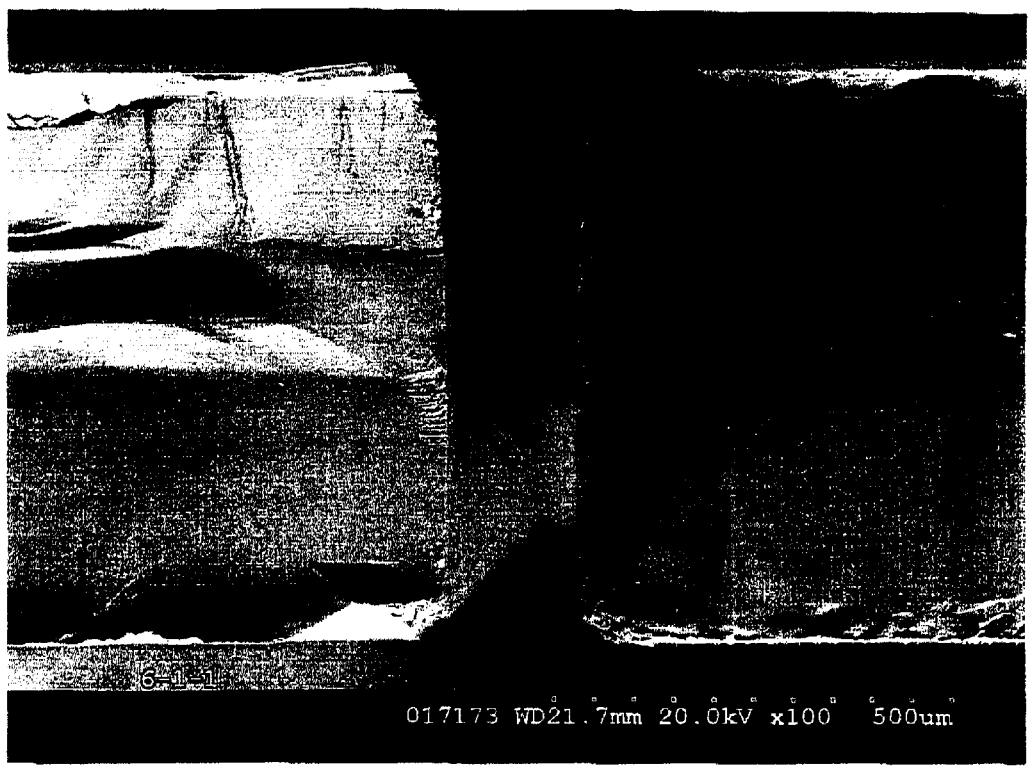
FIG. 18 is a SEM image of this channel in a ~700 micron thick silicon wafer.

FIG. 18 shows an SEM image of the cross section of a 200 micron channel in silicon. The channel was drilled using the strategy of FIG. 16.

The drilling parameters for this channel are:

Pulse energy=138 micro-Joules

Galvanometer scanning speed for Bottom Step 1, Top Step 1 & 2=111 mm/s

Galvanometer scanning speed for Bottom Step 2, Top Step 3=222 mm/s $O_{centre}$=30 microns $n_{laserlines}$ for Bottom Step 1=6

$z_{integer}$ for Bottom Step 1=19

$n_{laserlines}$ for Bottom Step 2=2

$z_{integer}$ for Bottom Step 2=1

$n_{laserlines}$ for Top Step 1=6

$z_{integer}$ for Top Step 1=3

$n_{laserlines}$ for Top Step 2=4

$z_{integer}$ for Top Step 2=1

$n_{laserlines}$ for Top Step 3=2

$z_{integer}$ for Top Step 3=1

Finally, the length of the street is determined by the area of the optical field of view. Repeating the process by stitching the fields of view and controlling position enables machining of long streets or channels.

The machining speed for this channel is 0.8 mm/s for a wafer of 700 microns in thickness using a laser operating at 355 nm.

EXAMPLE 2

120 Micron Channels in Silicon

Figure 19:
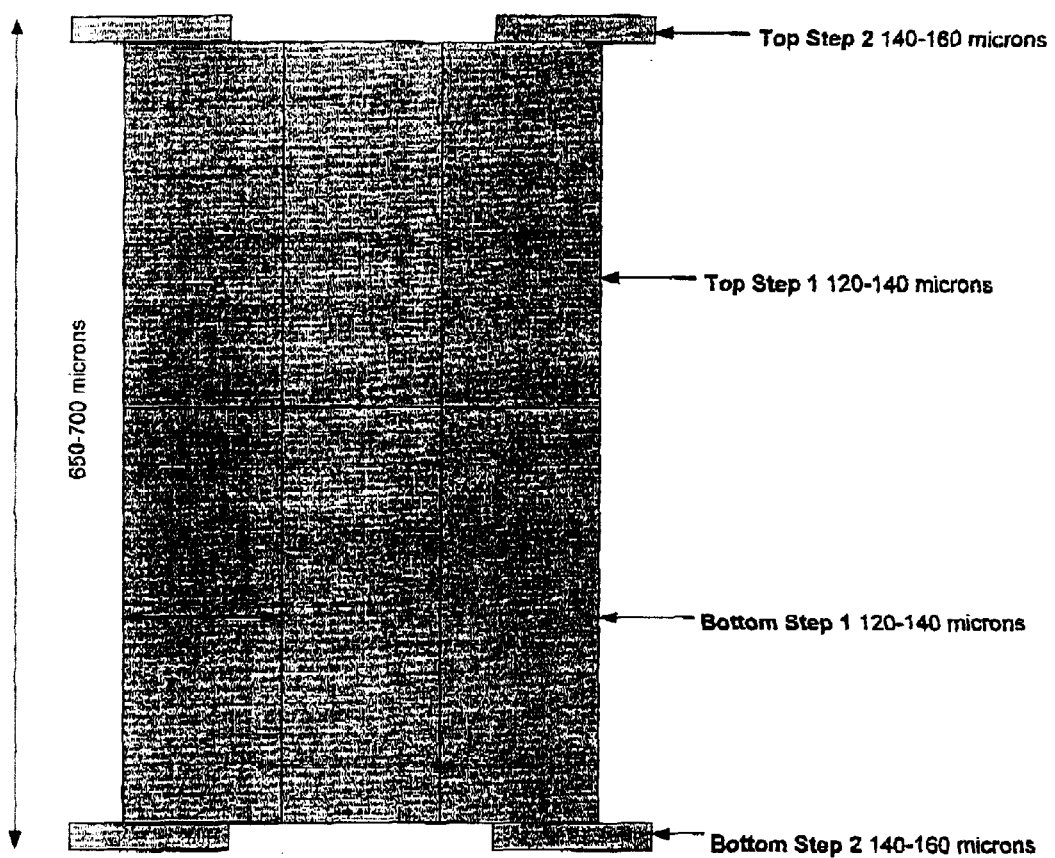
FIG. 19 is a diagrammatic side view of another channel illustrating the machining strategy.

FIG. 19 gives a graphical example of the drilling strategy applied to cut a 120 micron channel. The channel is cut by cutting half way from the bottom of the wafer, and then finished by turning the wafer over and finishing cutting the channel. This ensures maximum speed. The wafer is cut from the bottom in two steps, Bottom Step 1 is for drilling the bulk of the channel up to the centre of the wafer, and Bottom Step 2 is a fast scan around the channel for cleaning and residual material.

The wafer is cut from the top in two steps. Top Step 1 is for drilling the bulk of the channel. Top Step 2 is a fast scan around the channel for cleaning any residual material.

Figure 20:
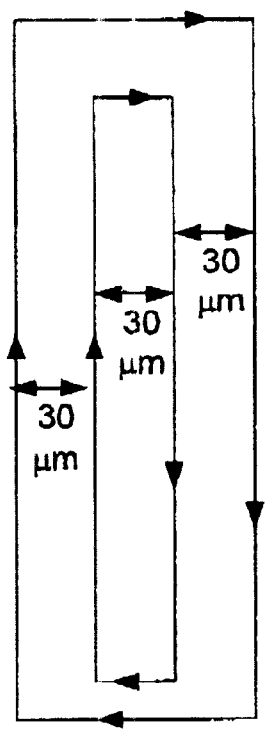
FIGS. 20 and 21 are diagrams illustrating machining laser paths for this channel.

The path the laser beam follows in Bottom and Top Step 1 is shown in FIG. 20.

Figure 21:
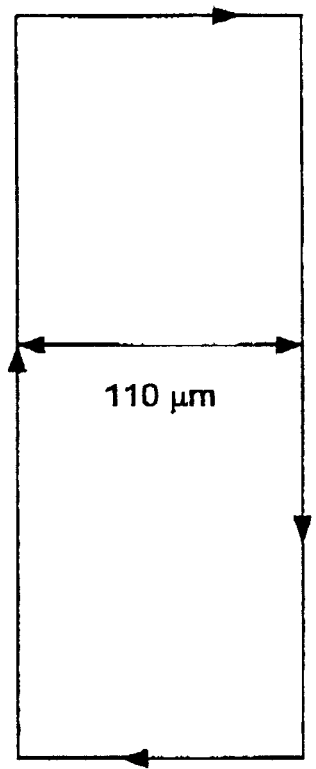

The path the laser beam follows in Bottom and Top Step 2 is shown in FIG. 21.

The drilling parameters for this channel are
Pulse energy=138 micro-Joules
Galvanometer scanning speed for Bottom Step 1, Top Step 1=111 mm/s
Galvanometer scanning speed for Bottom Step 2, Top Step 2=222 mm/s
$O_{centre}$=30 microns
$n_{laserlines}$ for Bottom Step 1=4
$z_{integer}$ for Bottom Step 1=14
$n_{laserlines}$ for Bottom Step 2=2
$z_{integer}$ for Bottom Step 2=1
$n_{laserlines}$ for Top Step 1=4
$z_{integer}$ for Top Step 1=14
$_{laserlines}$ for Top Step 2=2
$z_{integer}$ for Top Step 2=1
The machining speed is 1 mm/s The machining rate in the above examples is dependent on the laser power. To exploit an increase in laser power it is essential to choose the beam diameter at focus such that the energy density is in the near linear or plateau region as illustrated in FIG. 6.

To optimise machining speed for through channels, the beam diameter, pulse repetition rate and therefore average power output of the laser, are selected so as to yield the fastest machining speed. These parameters will dictate the galvo scan velocity, number of parallel laser lines, n_laserlines, and the number of steps, z_integer, through the sample.

This aspect of the invention enables exploitation of higher power laser systems for increasing machining speed without affecting the quality of the machined substrates.

The example for a 120 micron channel is in a 700 micron wafer. A 1 mm/s speed is achievable at the specified laser energy. For a threefold increase in laser power for a laser operating at this wavelength 3 mm/s is possible.

For thinner wafers the machining speed is increased as z_integer and n_laser lines can be reduced. Accordingly, in a 500 micron wafer, speeds in the region of 1.4 to 1.5 mm/s are possible. Scaling with a threefold increase in power gives ~4.5 mm/s.

Finally, it can also be demonstrated that this is achievable with a 532 nm laser. In particular, where machining form the topside and bottomside is used chipping can be eliminated. The power levels available form 532 nm sources are significantly higher and therefore significant speed improvements are possible.

The invention is not limited to the embodiments described but may be varied in construction and detail.

What is claimed is:

1. A method of machining a semiconductor material using a laser beam in which a formation is machined in the material to a width S using a laser beam of intensity $I_B$, and in which the beam is controlled to machine the material with a kerf K, characterised in that,
the beam is controlled to scan n times, n being $n \geq 1$ and, where n>1, each subsequent scan is laterally offset and parallel to a preceding scan, and n is $\geq$S/K.

2. A method as claimed in claim 1, wherein the value for $I_B$ is chosen to lie in a range of values of $I_B$ for which material removal rate increases with increasing $I_B$.

3. A method as claimed in claim 2, wherein $I_B$ is in a range for which material removal rate increases at a rate of at least 30% with increasing intensity.

4. A method as claimed in claim 1, wherein the lateral offset between scans is in the range from one micron to the kerf K.

5. A method as claimed in claim 1, wherein the lateral offset between scans is selected by varying the lateral offset in steps from one micron to the kerf until the net machining speed is optimised.

6. A method as claimed in claim 1, wherein machining is achieved by repeating scans with $n \geq 1$ in each of a number of a number of steps (z) so that material is removed in a sequence of steps from the surface downwards.

7. A method as claimed in claim 1, wherein the beam dimensions at focus are controlled so that the beam intensity, $I_B$, results in minimisation of the total number of scans required to define the required formation.

8. A method as claimed in claim 1, wherein the laser beam is pulsed, and the pulse repetition frequency and scan speed are chosen to provide a pulse overlap in the range of 30% to 98%.

9. A method as claimed in claim 1, wherein the laser beam is pulsed, and the pulse overlap is selected in the region of 30% to 85% to control and refine the texture and roughness of the walls of a machined channel or the walls and bottom of a machined trough and to clean residual debris.

10. A method as claimed in claim 1, wherein the channel width (S) is chosen so that the net machining speed is fastest when compared to the machining speed for larger or smaller channel widths as machined under optimal values for the number of parallel laser lines for that particular channel width.

11. A method as claimed in claim 1, wherein the laser beam wavelength is in the range of 350 nm to 550 nm, the repetition frequency is greater than 5 kHz, and the average laser beam power is greater than 3 W.

12. A method as claimed in claim 1, wherein the laser beam wavelength is in the range of 250 to 300 nm, the repetition frequency is greater than 1 kHz, and the average power output is greater than 1 W.

13. A method as claimed in claim 1, wherein scan velocity, laser power, and pulse overlap are chosen to control depth of material removal in any one scan.

14. A method as claimed in claim 1, comprising the further step of, after machining, performing a final laser scan in which:
the beam diameter is greater than the width S, and
the beam intensity is below a machining intensity threshold;
whereby a machined formation is cleaned.

15. A method as claimed in claim 1, wherein the method is performed to machine through channels to singulate die.

16. A method as claimed in claim 1, wherein the semiconductor material is a substrate for a micro-fluidic.

17. A method as claimed in claim 1, wherein a trench is formed in a surface of the substrate, the trench being suitable to act as a fluid delivery channel of a micro-fluidic device.

18. A method as claimed in claim 1, wherein the number of scans and lateral offsets of the scans is varied so that a tapered structure is formed in the material.

19. A method as claimed in claim 1, wherein a tapered structure is formed in a circular or elongated aperture.

20. A method as claimed in claim 6, wherein a plurality of tapered structures are machined to form wells, funnels and through hole channels of the micro-fluidic device.

21. A method as claimed in claim 1, wherein the material is machined from a top side, and subsequently from a bottom side, the formations from the sides joining to form a single through formation.

22. A method as claimed in claim 21, wherein a top side camera and a bottom-side camera are aligned and calibrated such that a transformation mapping coordinates of the top camera to coordinates of the bottom camera is known, and the top side and bottomside material coordinates are registered with respect to each other for registration of machining on both sides.

23. A method as claimed in claim 21, wherein machining of the material from both sides enables the formation of curved and tapered elongate and circular wall structures.

24. A method as claimed in claim 21, wherein a fume extraction head is used for extraction of fumes and solid debris from above and below the material, and wherein assist gas is directed at the material to control the deposition of debris and assist the machining process.

25. A laser machining apparatus comprising a laser source, means for directing a laser beam from the source at a semiconductor material to machine with a kerf K to a width S, and a controller for controlling parameters of the laser beam, characterised in that, the controller comprises means for directing the laser beam in a plurality of n parallel passes, said passes being laterally offset, and wherein n is greater than or equal to S/K.

26. A laser machining apparatus as claimed in claim 25 wherein the controller comprises means for controlling laser beam intensity ($I_B$) so that it lies in a range of values of intensity for which material removal rate increases with increasing intensity.

27. A laser machining apparatus as claimed in claim 25 further comprising a fume extraction system having suction inlets above and below the material support means.

28. A laser machining apparatus as claimed in claim 25 further comprising a gas blowing system comprising nozzles for directing an assist gas over the material being machined.

29. A laser machining apparatus as claimed in claim 25 incorporating a vision system which consists of top and bottom camera systems in registration with each other, and a controller comprising means for using images from the cameras to ensure registration of the material after flipping.

* * * * *